Sept. 22, 1959
B. H. CAMP ET AL
2,905,055
RAM AIR BOMB EJECTOR
Filed Feb. 4, 1957
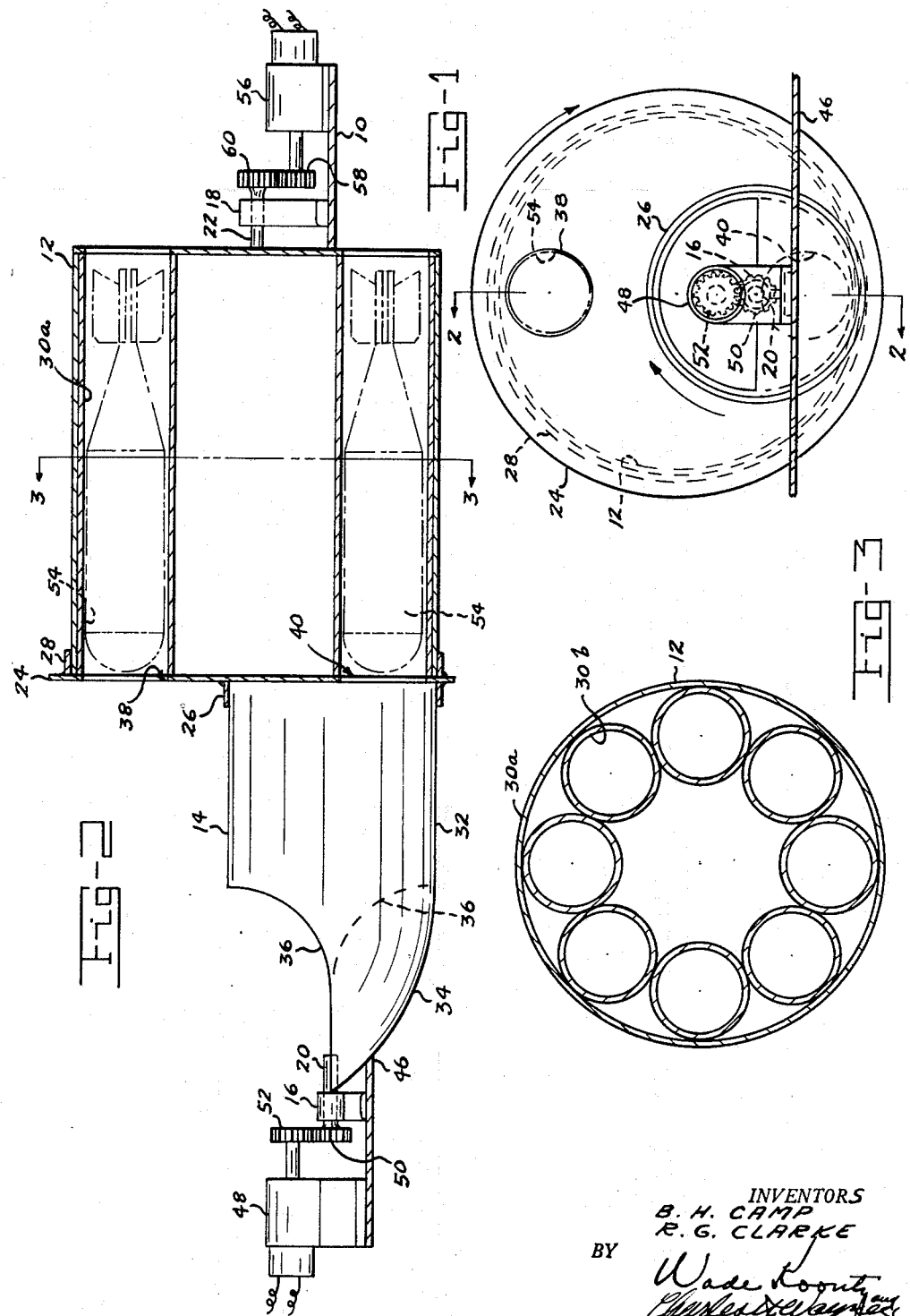
INVENTORS
B. H. CAMP
R. G. CLARKE
BY
Wade Koontz
Charles W. Wayne
ATTORNEYS

2,905,055
RAM AIR BOMB EJECTOR

Burton H. Camp, Middletown, and Richard G. Clarke, Hartford, Conn.

Application February 4, 1957, Serial No. 638,187

4 Claims. (Cl. 89—1.5)

This invention relates to a bomb ejection device for use in high speed aircraft.

Bomb ejection devices for general purpose bombs have traditionally relied upon the gravitational fall of the bomb out of the bomb bay of an aircraft. As planes have increased in speed this method of releasing bombs has encountered several problems, especially in the release of smaller size bombs such as light weight photoflash bombs. Light weight bombs do not overcome the air pressure and turbulence of the slip stream of high speed aircraft in force fall and the slip stream tends to force smaller bombs back into the bomb bay of the aircraft. This can either totally prevent the release of the bomb, possibly resulting in the detonation of the bomb within the aircraft, or else can cause a momentary delay through "flutter" of the bomb in the air stream which results in the inaccurate delivery of the bomb.

Several devices have been developed to overcome the above mentioned problem. However, these devices rely upon a special power source to forcibly propel or catapult the bomb from the aircraft. Such devices are costly and create an additional burden upon the power system of the aircraft.

The failure of a bomb to separate from an aircraft is particularly dangerous in the case of photoflash bombs. Such bombs have time fuses intended to detonate the bomb in midair. If the arming mechanism is actuated to arm a bomb which fails to leave the aircraft the result will be an explosion of the bomb in the aircraft.

It is an object of the present invention to provide a bomb release device which will release bombs from a high speed aircraft in a positive manner without danger of the bomb being retarded by the slip stream of the aircraft.

It is a further object of the present invention to utilize the slip stream of high speed aircraft to effect the release of bombs thereby avoiding the use of auxiliary power sources.

It is still another object of the present invention to provide a bomb release device which will permit the use of an arming mechanism capable of arming a bomb as the last portion of the bomb clears the aircraft.

It is a further object of the present invention to provide a bomb ejection device which may be readily installed on and removed from an aircraft.

It is another object of the present invention to provide a bomb release device which interferes to a minimum degree with the streamline contour of the aircraft and which avoids the necessity for opening bomb bay doors in order to deliver bombs.

An additional object of the present invention is to provide a bomb ejection device which is simple in construction, positive in operation, and inexpensive to manufacture.

Other objects of the present invention will become apparent from the following detailed description, taken in conjunction with the accompanying drawings, in which:

Figure 1 is an end elevation view of a bomb ejection device embodying the features of the present invention;

Figure 2 is a sectional view of the structure shown in Figure 1, taken along the line 2—2 thereof, and;

Figure 3 is a sectional view of the structure of Figure 2 taken along the line 3—3 thereof, bomb outlines being omitted.

Referring now to the drawings and particularly to Figure 2 thereof, the numeral 10 designates the bottom of an aircraft fuselage on which a bomb release device embodying the features of the present invention has been mounted. The bomb release device includes two main, separately rotatable components: a bomb carriage 12 and air valve or air guide 14. The entire device is supported by means of supporting members 16 and 18 having spindles 20 and 22 journaled for rotation therein, together with an intermediate supporting wall 24 having bearing sleeves 26 and 28 secured on opposite sides thereof. The supporting members 16 and 18 are affixed directly to the floor of the fuselage 10, while the intermediate supporting wall 24 may be secured to any convenient structural part of the aircraft (not shown). The valve 14 is rotatably supported between the spindle 20 and bearing sleeve 26, while the bomb carriage 12 is rotatably supported between the bearing sleeve 28 and the spindle 22. While the valve 14 and bomb carriage 12 are of divergent diameters, their lowermost exterior surfaces are substantially in alignment. It should be noted that the valve 14 and bomb carriage 12 do not have to be coaxial as their rotational movements are entirely independent of one another.

The bomb carriage 12 is generally cylindrical in shape and is mounted so that its axis is longitudinal of the aircraft. Arranged annularly about the axis of rotation of the carriage 12 are eight identical bomb chambers 30a, 30b, 30c, 30d, 30e, 30f, 30g, 30h which are tubular in shape and have inside diameters slightly greater than the diameter of the bomb they are designed to hold.

The valve or air guide 14 may be conveniently formed from a unitary piece of material and is provided with a main body portion 32 having the shape of a hollow right circular cylinder. Forward of the main body portion 32 one cross sectional half 34 of the valve tapers curvedly inwardly forming a closure over that half of the valve. While the curved hall 34 may be formed in accordance with one of the standard geometric shapes, such as an ellipsoid, the curve may be any empirically derived surface having low air resistance qualities. The cross sectional forward half of the valve 14 opposite circular half 34 is cut out or removed at 36 so that air directed at the valve at said half will be freely admitted into the interior of the airguide or valve 14.

The intermediate supporting wall 24 may be conveniently formed from a piece of sheet metal or other sheet material and is circular in shape. Near its top, the wall 24 is provided with a circular port 38 which is in alignment with a bomb chamber when it is disposed in a top dead center position (30a in Figures 2 and 3). Furthermore the diameter of port 38 is equal to the inside diameter of the bomb chambers 30a, etc. A similar circular port 40 is formed near the bottom of the wall 23 so as to be in alignment with a bomb chamber when one is disposed in a bottom dead center position (30e in Figures 2 and 3). The port 40 serves the purpose of putting the lowermost bomb chamber in communication with the interior of the valve 14.

It will be noted from Figure 2 that the entire lower portion of the bomb release device extends beneath the fuselage 10 through an opening 42 formed therein. The bomb bay doorway may be used as this opening if provided with suitable adapting members to snugly fit around the carriage 12 and valve 14. The amount by which the carriage 14 extends below the fuselage 10 is slightly greater than the diameter of the bomb chambers 30a, etc. in order to assure that the bombs will clear the fuselage as they are released. This clearance distance is indicated at 44 in Figure 2. The valve 14 is of sufficient size that when it is in its off position (illustrated in Figure 2) the open forward half defined by the edge 36 is disposed entirely within the aircraft. The curved portion 34 fits closely against the fuselage of the aircraft as at 46 whereby the lowermost bomb chamber 30e is effectively sealed off from the slip stream passing beneath the fuselage.

The operation of the bomb release device is relatively simple and involves only the rotation of the bomb carriage 12 and valve 14. Prior to take off, the bomb chambers 30a, 30b, 30c, etc. are loaded with the bombs to be dropped. Only one bomb is dropped at a time and this is from the lowermost bomb chamber, which is 30e in Figure 2. The actual release is accomplished by the rotation of valve member 14, which may be effected by any suitable means such as the actuation of an indexing motor 48 which drives spindle 20 through spur gears 50 and 52. The rotation of valve 12 removes the closure formed by the curved portion 34 from in front of the bomb chamber 30e. The forward end of valve is open to the aircraft slip stream and the entire inner surface of the valve 14 serves to guide air from the slip stream into the bomb chamber 30e. In a high speed aircraft the air will be directed into the bomb chamber 30e with a ram effect, producing a pressure sufficient to force the bomb, indicated at 54, out of the chamber 30e in a swift and positive manner. Because the bomb fits closely against the sides of the bomb chamber almost all the air pressure in the air chamber is used to act upon the nose of the bomb and force it rearwardly. After the bomb has been released the valve 14 is returned to the original closed position illustrated in Figure 2.

When it is desired to release another bomb the bomb carriage is rotated and indexed so as to position the next adjacent bomb chamber, e.g. 30d, in the lowermost position formerly occupied by 30e. This rotational movement may be accomplished by any suitable means, such as the actuation of motor 56 to drive spindle 22 through spur gears 58 and 60. Limit switches (not shown) may be employed to accomplish the correct positioning of the carriage 12. Once a new loaded chamber is positioned in the lowermost position in line with port 40, the device is again ready for a repetition of the process described above in order to release another bomb.

While it will be apparent that the preferred embodiment herein disclosed is well calculated to fulfill the object above stated, it will be appreciated that the invention is suceptible to modification, variation, and change without departing from the spirit and scope of the invention as set forth in the accompanying claims.

We claim:

1. A bomb disposal device for an aircraft having a fuselage comprising a rotatable bomb carriage having a longitudinally extending bomb chamber adapted to receive a bomb, means for rotating said bomb chamber from a position within the fuselage for loading the same with a bomb, to a position outside of the fuselage of the aircraft for rearward disposal of the bomb, said chamber having the front and rear ends thereof open to the interior of the fuselage when located within the fuselage and open to atmosphere when located outside of the fuselage, a rotary air scoop valve member located in front of said bomb chamber when the bomb chamber is disposed outside of said fuselage, said rotary air scoop valve member having an air deflector on one side of its rotary axis for deflecting slip stream air away from said chamber when outside of said fuselage when rotated to one position and air scoop means on the other side of its axis for directing slip stream air into the forward end of said chamber in positions outside of said fuselage, when in another position to rearwardly displace a bomb positioned in said chamber into the slip stream, and means for selectively rotating said air scoop to said positions.

2. A bomb release device for an aircraft having a fuselage, comprising a rotatable bomb carriage located within the aircraft having a plurality of longitudinally extending bomb chambers open at their forward and rear ends and disposed annularly about the axis of rotation of said carriage to successively dispose said chambers below the fuselage of the aircraft, air scoop and air deflector guide means rotatably mounted on an axis parallel to the rotary axis of the carriage in front of said carriage and in front of the chamber which is positioned below the fuselage, said air scoop and air deflector guide means having an air deflector portion disposed on one side of its rotary axis for deflecting slip stream air away from the forward end of the last mentioned chamber, when positioned outside of said fuselage when the guide means is rotated to one position, and having an air scoop portion at the opposite side of its rotary axis for directing slip stream air passing the fuselage into the forward end of the last mentioned bomb chamber when rotated to another position, to displace a bomb out of the rear end of said chamber into the slip stream air passing the fuselage, and means for selectively rotating said air deflector portion and said air scoop portion to said positions in front of said chamber when in the last mentioned position.

3. A bomb release device for an aircraft, comprising a bomb carriage adapted to be rotatably mounted on a longitudinal axis in an aircraft fuselage so as to project partially outside of the fuselage, a plurality of longitudinally extending open ended bomb holding chambers attached to the carriage at equal distances from the rotary axis of the carriage so as to be successively moved to a position in the slip stream outside of the fuselage by rotation of the carriage, a rotary air deflector and air scoop valve mounted in front of the portion of the carriage which extends outside of said fuselage, said valve having an air deflector portion movable in front of the bomb holding chamber which is moved outside of the fuselage by said carriage, to deflect slip stream air away from the forward end of said chamber when said valve is rotated to one position, said valve having an air scoop portion rotated to a position in front of the bomb holding chamber which is outside of the fuselage when the valve is rotated to a second position to direct slip stream air into the forward end of the last mentioned chamber to displace a bomb, when contained in said chamber, outwardly through the rear end thereof into said slip stream and means for rotating said valve to each of said positions.

4. A bomb release device for an aircraft having a fuselage comprising a rotary bomb carriage mounted on a longitudinal axis within the fuselage and having a lower portion projecting outside of the fuselage below the same, a plurality of open ended cylindrical bomb holding chambers equally spaced about said longitudinal axis for successive movement outside and below said fuselage into slip stream air upon rotative adjustment of said carriage, a rotary air scoop and air deflector valve member disposed on a longitudinal axis within the fuselage having a portion there of disposed outside of the fuselage in the slip stream in front of the rotary carriage and in front of each chamber when moved by said carriage outside and below said fuselage, said valve member having a semicircular air deflector portion at one side of its longitudinal axis to close the forward end of the last mentioned bomb chamber and deflect slip stream air therefrom when said valve member is rotated to one position, said valve member having semicylindrical air scoop portion at the opposite side of its longitudinal axis facing forwardly in said slip stream for directing slip stream air into said chamber to displace a bomb rearwardly out of said chamber into said slip stream when said valve means is rotated to a second position, means for rotating said valve means to each of said positions, and means for rotating said carriage to progressively move said chambers into position behind said rotary valve means.

References Cited in the file of this patent

UNITED STATES PATENTS

| | | |
|---|---|---|
| 2,381,332 | Boldt | Aug. 7, 1945 |
| 2,470,120 | Walker | May 17, 1949 |
| 2,479,746 | J'Aanson | Aug. 23, 1949 |
| 2,714,999 | Thiebolt et al. | Aug. 9, 1955 |
| 2,723,093 | Price et al. | Nov. 8, 1955 |

FOREIGN PATENTS

| | | |
|---|---|---|
| 15,871 | Great Britain | 1913 |